(12) United States Patent
Merchant (10) Patent No.: US 9,239,794 B1
(45) Date of Patent: Jan. 19, 2016

(54) MANAGING A PREFETCH BUFFER WITH PROBABILISTIC ACCESS PREDICTIONS

(71) Applicant: Google Inc., Mountain View, CA (US)

(72) Inventor: Arif Merchant, Los Altos, CA (US)

(73) Assignee: Google Inc., Mountain View, CA (US)

( * ) Notice: Subject to any disclaimer, the term of this patent is extended or adjusted under 35 U.S.C. 154(b) by 311 days.

(21) Appl. No.: 13/873,682

(22) Filed: Apr. 30, 2013

Related U.S. Application Data (60) Provisional application No. 61/657,991, filed on Jun. 11, 2012.

(51) Int. Cl.
*G06F 12/00* (2006.01)
*G06F 12/08* (2006.01)

(52) U.S. Cl.
CPC .................. *G06F 12/0862* (2013.01)

(58) Field of Classification Search
CPC ... G06F 12/0862; G06F 9/383; G06F 9/3802; G06F 2212/6022; G06F 12/121; G06F 12/122; G06F 9/3814; G06F 2212/6028; G06F 9/30047; G06F 12/0811; G06F 12/123; G06F 12/126; G06F 13/1626; G06F 13/1647; G06F 2212/6026

USPC .................. 711/100, 137, 151, 158
See application file for complete search history.

(56) References Cited

U.S. PATENT DOCUMENTS

| 7,039,766 B1 * | 5/2006 | Smith .......................... 711/137 |
| 2003/0033461 A1 * | 2/2003 | Malik et al. .................. 710/107 |
| 2009/0199190 A1 * | 8/2009 | Chen et al. .................... 718/102 |
| 2014/0115089 A1 * | 4/2014 | Maybee et al. ............... 709/213 |

* cited by examiner

*Primary Examiner* — Zhuo Li
(74) *Attorney, Agent, or Firm* — Lerner, David, Littenberg, Krumholz & Mentlik, LLP (57) ABSTRACT

A method for managing data items retrieved for storage in a prefetch memory buffer includes determining a probability that a first data item will be requested for retrieval. The method includes estimating a first request time at which the new data item will be requested. The method also includes determining a time differential for the first data item, wherein the time differential is determined based on current time and the first request time. The method includes calculating a first prefetch priority value for the first data item based on the first data item probability and the time differential. The method includes randomly comparing the first prefetch priority value of the first data item to the prefetch priority values of the one or more stored data items to identify at least one stored data item having a prefetch priority value lower than the first prefetch priority value.

20 Claims, 4 Drawing Sheets

MANAGING A PREFETCH BUFFER WITH PROBABILISTIC ACCESS PREDICTIONS

CROSS-REFERENCE TO RELATED APPLICATIONS

The present application claims the benefit of the filing date of U.S. Provisional Patent Application No. 61/657,991 filed Jun. 11, 2012, the disclosure of which is hereby incorporated herein by reference.

BACKGROUND

The currently described disclosure relates to managing a prefetch buffer with probabilistic access predictions. Storage systems usually "prefetch" data from one or more disks for temporary storage in memory, e.g., Dynamic Random Access Memory (DRAM), when the system perceives that the prefetched data might be requested in the near future. The method used to predict which data will be needed is imperfect and usually relies on an extrapolation from observed data accesses by a user. In addition, the total amount of memory available to store such data is limited. Hence, when a new access is identified or predicted, the system necessarily must determine whether to prefetch additional data, and if so, which data currently in memory to evict to make space for storing the newly prefetched data.

SUMMARY

The disclosure, in one aspect, features a method for managing data items retrieved for storage in a prefetch memory buffer. The method includes determining a probability that a first data item will be requested for retrieval. The method includes estimating a first request time at which the new data item will be requested. The method also includes determining a time differential for the first data item, wherein the time differential is determined based on current time and the first request time. The method includes calculating a first prefetch priority value for the first data item based on the first data item probability and the time differential. The method includes calculating the prefetch priority values for one or more stored data items stored in the prefetch memory buffer. The method includes randomly comparing the first prefetch priority value of the first data item to the prefetch priority values of the one or more stored data items to identify at least one stored data item having a prefetch priority value lower than the first prefetch priority value.

In some implementations, the method further includes grouping the one or more stored data items stored in the prefetch memory buffer into subsets of similar probability. In some implementation, calculating the prefetch priority values for one or more stored data items includes calculating the prefetch priority values for each stored data item identified as having the largest time differential in each subset of similar probability. In some implementations, the method further includes replacing the at least one stored data item identified as having a prefetch priority value lower than the first prefetch priority value with the first data item in the prefetch memory buffer.

In some implementations, the method further includes analyzing one or more properties associated with requests of one or more consecutively requested data items to determine a probability that a new data item will be requested. In one implementation, this involves examining a group of data item requests to see if we can find a pattern that can then be used to predict future requests. Patterns include data item requests that are near each other in terms of arrival time of the request or near each other in terms of the location of the address of the data item in storage. Example patterns include the occurrence of sequential input/output (IO) requests, strided IO requests, and file requests from a common directory (folder). Strided IO's are requests for data items that are located in memory a fixed distance apart. In some implementations, the method further includes analyzing one or more properties for request of one or more subsequent data items to estimate a time at which a new data item will be requested.

In some implementations, the method includes recalculating prefetch priority values for one or more data items stored in the prefetch memory buffer until a new request is received for a data item or until it is determined a new data item will probably be requested. In some implementations, the method includes assigning a highest prefetch priority value to a new data item actually requested by a user with a designation indicating the new data item will be requested.

The disclosure, in another aspect, features a system for managing data items retrieved for storage in a prefetch buffer. The system includes a processor, and a memory. The memory includes code representing instructions that when executed cause the processor to determine a probability that a first data item will be requested for retrieval, estimate a first request time at which the new data item will be requested, determine a time differential for the first data item, wherein the time differential is determined based on current time and the first request time, calculate a first prefetch priority value for the first data item based on the first data item probability and the time differential, calculate prefetch priority values for one or more stored data items stored in the prefetch memory buffer, and compare the first prefetch priority value of the first data item to the prefetch priority values of the one or more stored data items to identify at least one stored data item having a prefetch priority value lower than the first prefetch priority value.

In some implementations, the memory includes code representing instructions that when executed cause the processor to group the one or more stored data items into subsets of similar probability. In some implementations, the memory includes code representing instructions that when executed cause the processor to calculate the prefetch priority values for each stored data item identified as having the largest time differential in each subset of similar probability. In some implementations, the memory includes code representing instructions that when executed cause the processor to replace the at least one stored data item identified as having a prefetch priority value lower than the first prefetch priority value with the first data item in the prefetch memory buffer.

In some implementations, the memory includes code representing instructions that when executed cause the processor to analyze one or more properties for requests of one or more subsequent data items to determine a probability that a new data item will be requested. In some implementations, the memory includes code representing instructions that when executed cause the processor to analyze one or more properties for request of one or more subsequent data items to estimate a time at which a new data item will be requested. In some implementations, the memory includes code representing instructions that when executed cause the processor to recalculate prefetch priority values for one or more data items stored in the prefetch memory buffer until a new request is received for a data item or until it is determined a new data item will probably be requested. In some implementations, the memory includes code representing instructions that when executed cause the processor to assign a highest prefetch priority value to a new data item actually requested by a user with a designation indicating the new data item will be requested.

The disclosure, in another aspect, features a computer program product, tangibly embodied on computer-readable media. The computer program product includes instructions that are operable to cause a data processing apparatus to determine a probability that a first data item will be requested for retrieval, estimate a first request time at which the new data item will be requested, determine a time differential for the first data item, wherein the time differential is determined based on current time and the first request time, calculate a first prefetch priority value for the first data item based on the first data item probability and the time differential, calculate prefetch priority values for one or more stored data items stored in the prefetch memory buffer, and compare the first prefetch priority value of the first data item to the prefetch priority values of the one or more stored data items to identify at least one stored data item having a prefetch priority value lower than the first prefetch priority value.

In some implementations, the computer program product includes instructions that are operable to cause a data processing apparatus to group the one or more stored data items into subsets of similar probability. In some implementations, the computer program product includes instructions that are operable to cause a data processing apparatus to calculate the prefetch priority values for each stored data item identified as having the largest time differential in each subset of similar probability. In some implementations, the computer program product includes instructions that are operable to cause a data processing apparatus to replace the at least one stored data item identified as having a prefetch priority value lower than the first prefetch priority value with the first data item in the prefetch memory buffer.

Other aspects and advantages of the current disclosure will become apparent from the following detailed description, taken in conjunction with the accompanying drawings, illustrating the principles of the disclosure by way of example only.

BRIEF DESCRIPTION OF THE DRAWINGS

The foregoing features of various implementations of the disclosure will be more readily understood by reference to the following detailed descriptions in the accompanying drawings, in which.

DETAILED DESCRIPTION OF ILLUSTRATIVE IMPLEMENTATIONS

Methods and system are described herein for determining which data to prefetch in response to predicted accesses and which stored data to evict from memory based on estimates of the probability of access for each of the data blocks currently in memory, the probability of access for the predicted data, and the predicted time of access for both.

Figure 1:
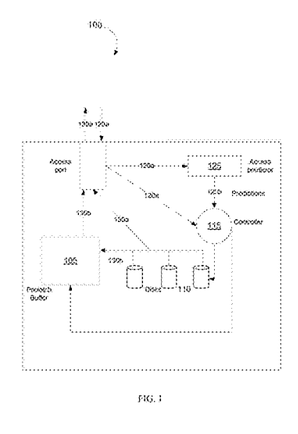
FIG. 1 is a schematic illustration of a storage system with a prefetch buffer, according to an illustrative implementation.

FIG. 1 is a schematic illustration of a storage system 100 with a prefetch buffer 105, according to an illustrative implementation. The storage system 100 includes a plurality of disks 110, memory used for a prefetch buffer 105, and a controller 115 that determines which predicted block(s) of prefetched data 130b to prefetch, and which stored block(s) of prefetched data 130b to evict from the prefetch buffer 105. When actual user requests (hereinafter "access requests") 120a for requested data 130a enter the storage system 100, an access prediction module 125 observes the access request 120a and produces probabilistic predictions of what predicted access requests 120b a user will make in the future for blocks of prefetched data 130b stored in disks 110. The access prediction module 125 periodically sends the controller 115 a list of block numbers (or file names or other identification of the data) for blocks of prefetched data 130b, a probability that a block of prefetched data 130b will be requested by an actual access request 120a, and a prediction of when the block of prefetched data 130b will be requested. The access prediction module 125 also may revise previous predictions.

The access prediction module 125 may produce the list of block numbers for blocks of prefetched data 130b, the probability that a block of prefetched data 130b will be requested by an actual access request 120a, and a prediction of when the block of prefetched data 130b will be requested by combining a variety of information sources. For example, the access prediction module 125 may receive hints from a user that a certain block of prefetched data 130b will be the target of an actual access request 120a at a particular point in time. Hints are information received from the user or an application that suggest or predict what future input/output (IO) requests for data items a user is likely to make. Alternatively, the access prediction module 125 may detect a sequential pattern of actual access requests 120a, strided pattern of actual access requests, or other pattern of actual access requests 120a from a user and project that pattern of actual access requests 120a into the future. When the user provides the hints, the predicted access times come from the user too, and the access prediction module 125 may estimate the probability of accessing a block of prefetched data 130b as 100%.

For example, hints may consist of a data location, a file name and a file start offset value, the length of data to be requested, the time at which the read request is likely to occur, or the probability with which the request will be made. Data locations can be the physical storage address of a data item. Hints may include all these elements, or just some of them. For example, one hint may include the location and size of the data and the probable time of a predicted access request 102b, but might not include the probability of request. Alternatively, the time of request may be missing.

In some implementations, if some of the information is missing, the system estimates the information. The system can estimate the information based on, for example, previous experience associated with the user. Such experience includes, for example, a time at which a particular user has given a hint in the past and the frequency with which such a hint has correctly predicted an actual access request 102a. In another implementation, by default, the probability of a request could be set to 1.0 because the user knows that he/she will need to make an actual data request 102a in the near future and the user inputs this information to the system by scheduling the request in advance. A user might schedule requests in advance that involve activities that are always scheduled to occur during, for example, non-normal business hours. For example, backup processes or batch processing of certain business data may be scheduled to take place during the early morning hours of a business day. If the time for a predicted access request 102b is unknown, the system 100 could use the recent rate of read requests to estimate the arrival time of a predicted access request 102b. For example, if a user has recently been reading at the rate of 100 IO requests/second, and this is the 200th outstanding hint that it will continue to occur, the predicted access request 102b is likely to arrive after 2 seconds. Therefore, the system can plan accordingly to perform the access request based on this hint.

When projecting from observed actual access requests 120a, the predicted time of access for a new block of data may be produced by projecting the time of access for the new block of data based on the access times of the observed actual access requests 120a. The access prediction module 125 may estimate a probability of receiving a predicted access request 120b based on historical patterns. For example, suppose a time-series of four actual access requests 120a has been observed as follows, wherein the first number in each pair represents the unique block number of a particular block of requested data 130a and the second number represents the time of receipt by the controller 115 of the access request 120a: (10, 123), (11,128), (12, 132), (13, 138). The access prediction module 125 may conclude that a fifth actual access request 120a, block "14", will be requested at approximately time "142" because the actual access requests 120a are approximately 4 to 5 time units apart. Also, if in the past, sixty percent of read sequences of four blocks of requested data 130a have extended into read sequences of five blocks of requested data 120a, then the access prediction module 125 may estimate that the probability of a user actually requesting block "14," is sixty percent.

The controller 115 receives these predictions and decides whether or not to prefetch the block of prefetched data 130b corresponding to the predicted access request 120b. If the system 100 receives an actual access request 120a from the plurality of disks 110 that is not stored in the prefetch buffer 105, i.e., not already predicted and prefetched as a block of prefetched data 103b, then that actual access request 120a for data 130a receives a higher priority for retrieval than any prefetched data 130b. Otherwise, the controller 115 computes the following prefetch priority value for a predicted block of prefetched data 130b in one implementation, in accordance with the following:

$$\text{prefetch\_priority} = \text{probability\_of\_access}/(\text{predicted\_access\_time} - \text{time\_now}) \quad \text{EQN. 1}$$

where, prefetch_priority is the prefetch priority value, probability_of_access is the probability of receiving an access request 120a, predicted_access_time is the time at which the data is predicted to be required, and time_now is the current time. The denominator of the EQN. 1 therefore is the time differential between current time and the predicted access time.

The controller 115 also computes the prefetch priority value for the blocks of prefetched data 130b, i.e., corresponding to predicted access requests 120b, currently stored in the prefetch buffer 105. If the prefetch priority value of any of the blocks of predicted prefetched data 130b related to currently predicted access requests 120b is higher than the priority value of stored prefetched data 130b already stored in the prefetch buffer 105, the controller evicts from the prefetch buffer 105 the stored prefetched data 130b with the lowest prefetch priority value and fetches the predicted prefetched data 130b with the highest prefetch priority value. This is repeated until an actual access request 120a arrives (thus pausing the prefetch process), or a new batch of predicted access requests 120b arrives at the controller 115 from the access prediction module 125. If the controller 115 chooses not to prefetch a block of prefetched data 130b now, or evicts a block of already stored prefetched data 130b, the controller 115 may keep the predicted access request 120b in a list to send to the controller 115 at a future time along with predicted access requests 120b produced by the access prediction module 125 at that future time. In some implementations, the controller may evict multiple blocks to make room for the new prefetched data. For example, if the prefetched data sizes are not fixed, a new prefetched data item may require more storage space than the stored data item that would next be evicted by the controller. For example, if the controller is prefetching files, rather than just blocks of data of a fixed size, the controller may need to evict multiple smaller files to make room for a new, larger file.

Because the prefetch buffer 105 is of limited size, the controller 115 cannot prefetch all predicted access requests 120b for storage in the prefetch buffer 105. To decide which ones to prefetch, the controller 115 must consider the certainty of the prediction for receiving an actual access request 120a for a block of prefetched data 130b and the prediction of the length of time until the block of prefetched data 130b will be requested by an actual access request 120a. For example, if the controller determines, based on actual access requests 120a that a block of data 130a, "block 100", will definitely be needed at one hour in the future, the controller 115 should not prefetch "block 100" of prefetched data 130b because there should be adequate time to do so closer to the predicted time. This reduces the amount of consumed storage space on the prefetch buffer 105.

Additionally, if the controller receives two predicted access requests 120b whose predicted access times are within seconds of each other, the controller 115 needs to determine which predicted block of prefetched data 130b to request from the plurality of disks 110. In this instance, the controller would prefer to fetch the data item corresponding to the request for which we have greater certainty. The controller determines which predicted block of prefetched data 130b to request based on the prefetch priority value. The prefetch priority value represents the expected number of actual access requests 120a for the block of predicted prefetched data 130b per unit of time that the predicted prefetched data 130b will occupy space in the prefetch buffer 105. This is in contrast with requests whose predicted times are far apart, in which case as described with respect to steps 215 and 220 of FIG. 2, the controller would be tasked with prefetching the data item for the predicted earlier request, even if it is less certain to occur.

To increase computational efficiency, instead of allowing the access prediction module 135 to assign any value of probability, the system 100 applies a (small) set of discrete probability values $\{p(1), p(2), \ldots, p(n)\}$; for example, $p(i) = i/n$. Where "i" represents a particular probability set for access probabilities of a particular value, and "n" represents the maximum number of discrete probability values. For example, for n=10, the predefined values that could be used are $\{p(1)=0.1, p(2)=0.2, \ldots, p(10)=1.0\}$, where blocks of data expected to be assigned to one of the predefined values based on a defined set of rules or simple calculation. Alternatively, the system 100 may round the probability value to the nearest probability value in this set for each of the blocks of prefetched data 130b relating to a predicted access request 120b produced by the access prediction module 125. The prefetch buffer 105 then maintains a number of "n" lists (i.e. $L(1), L(2), \ldots, L(n)$) corresponding to these probability values. $L(i)$ contains the set of blocks of prefetched data 130b with access probability $p(i)$. Within each list, each block of data is ordered in the list based on the predicted time of arrival estimated for each of the predicted access requests 120b. This is equivalent to sorting each list according to the prefetch priority values for each block of the stored prefetched data 130b because, for a fixed probability value of p(i), the prefetch priority values are greater for predicted access requests 120b predicted to arrive soonest.

In order for the controller 115 to decide when to prefetch a block of prefetched data 130b related to a newly predicted access request 120b and which block(s) of stored prefetched data 130b should be evicted to make room for new prefetched data 130b, the controller 115 evaluates the last block of stored prefetched data 130b from each of list, L(1) ... L(n). The last block of stored prefetched data 130b is the one with the greatest predicted time before which the system estimates it will receive a predicted access request 120b for the block. The controller 115 then computes the prefetch priority values for these "n" blocks of stored prefetched data 130b and the prefetch priority value for the newly predicted block of prefetched data 130b corresponding to the newly predicted access request 120b. If the prefetch priority for the newly predicted prefetched data 130b is higher than any of the previously evaluated stored blocks of prefetched data 130b, the controller 115 evicts the stored block of prefetched data 130b having the greatest predicted time before which the system estimates its predicted access request 120b will arrive. Also, the access predictor 125 re-evaluates blocks of stored prefetched data 130b having arrival times of predicted access requests 120b that have passed already. The access prediction module 125 does this to determine whether the probability of receiving a predicted access request 120b has changed and what the new predicted times of receipt should be. This interaction of components of the system 100 is efficient because the controller 115 only needs to calculate prefetch priority values of a small number "n" of prefetched blocks to decide which stored blocks of prefetched data 130b to evict and which new blocks of prefetched data 130b to store. In many cases, a value of "n" as small as two (2) to four (4) may suffice.

Figure 2:
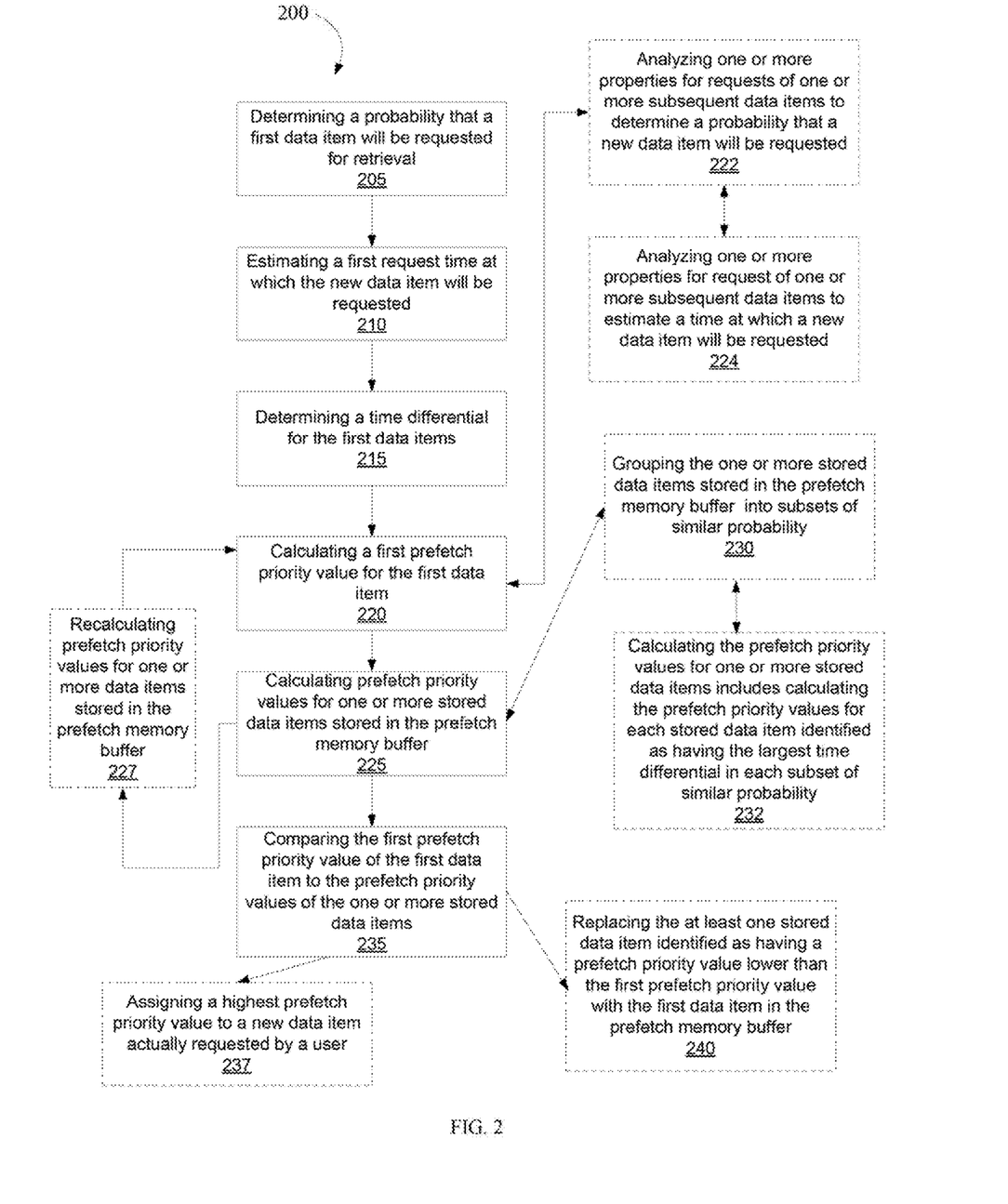
FIG. 2 is a flowchart of a method for managing data items retrieved for storage in a prefetch memory buffer, according to an illustrative implementation.

FIG. 2 is a flowchart 200 of an implementation of a method for managing data items, i.e. blocks of data, retrieved for storage in a prefetch memory buffer, such as the prefetch memory buffer 105 described above with regard to FIG. 1. As described in relation to FIG. 3, these method steps are performed by a computing system comprising at least a processor and memory including code thereon for execution by the processor to provide data items, i.e. blocks of data, to a user requesting access. The method includes determining 205 a probability that a first data item will be requested for retrieval by a user. As described above in relation to FIG. 1, this can be calculated, in one implementation, based on the predicted behavior of the user requesting access. The method therefore further includes estimating 210 a first request time at which the new data item will be requested. As described above in relation to FIG. 1, this can be estimated, in one implementation, based on the predicted behavior of the user requesting access.

The method also includes determining 215 a time differential for the first data item, wherein the time differential is determined based on current time and the estimated first request time, i.e., the time at which the system predicts the user will request that first data item. The method includes calculating 220 a first prefetch priority value for the first data item based on the first data item probability and the time differential. The prefetch priority value therefore increases as the time differential decreases. In other words, if the data item is predicted for imminent request, the prefetch priority value will be, and should be, higher than that of a data item predicted for request at a relatively later time. The method therefore enables retrieval of data items predicted to be relevant to the needs of a user and imminently requested by the user.

The method includes calculating 225 the prefetch priority values for one or more stored data items stored in the prefetch memory buffer for potential retrieval by a user requesting access at a future time. The method includes randomly comparing 235 the first prefetch priority value of the first data item to the prefetch priority values of the one or more stored data items to identify at least one stored data item having a prefetch priority value lower than the first prefetch priority value. In some implementations, the method further includes grouping 230 the one or more stored data items stored in the prefetch memory buffer into subsets of similar probability. In some implementations, calculating the prefetch priority values for one or more stored data items includes calculating 232 the prefetch priority values for each stored data item identified as having the largest time differential in each subset of similar probability. In some implementations, the method further includes replacing 240 the at least one stored data item identified as having a prefetch priority value lower than the first prefetch priority value with the first data item in the prefetch memory buffer. This comparison technique is helpful in increasing computational efficiency because prefetch priority values are calculated only for each stored data item identified as having the largest time differential in each subset (i.e. list) of similar probability.

In some implementations, the method further includes analyzing 222 one or more properties associated with requests of one or more consecutively requested data items to determine a probability that a new data item will be requested. This involves examining a group of data item requests to see if a pattern can be identified that can then be used to predict future requests. Patterns include data item requests that are near each other in terms of arrival time of the request or near each other in terms of the address of the data item in storage. Examples include sequential input/output (IO) requests, strided IO requests, and file requests from a common directory (folder). Strided IO requests are requests for data items that are located in memory a fixed distance apart from each other. In some implementations, the method further includes analyzing 224 one or more properties for request of one or more subsequent data items to estimate a time at which a new data item will be requested. For example, the method may analyze a pattern of access requests to determine probability of requesting a new data item and to estimate the request time for the new data item in keeping with the pattern of access requests.

In some implementations, the method includes recalculating 227 prefetch priority values for one or more data items stored in the prefetch memory buffer until a new request is received for a data item or until it is determined a new data item will probably be requested. This is necessary because the prefetch priority value is time dependent and as an estimated time approaches, the prefetch priority value increases. Likewise, if the probability of request changes, the prefetch priority value changes accordingly. In some implementations, the method includes assigning 237 a highest prefetch priority value to a new data item actually requested by a user. In this implementation, fetching a data item that is actually requested will always trump prefetching a data item that is predicted to be requested.

Figure 3:
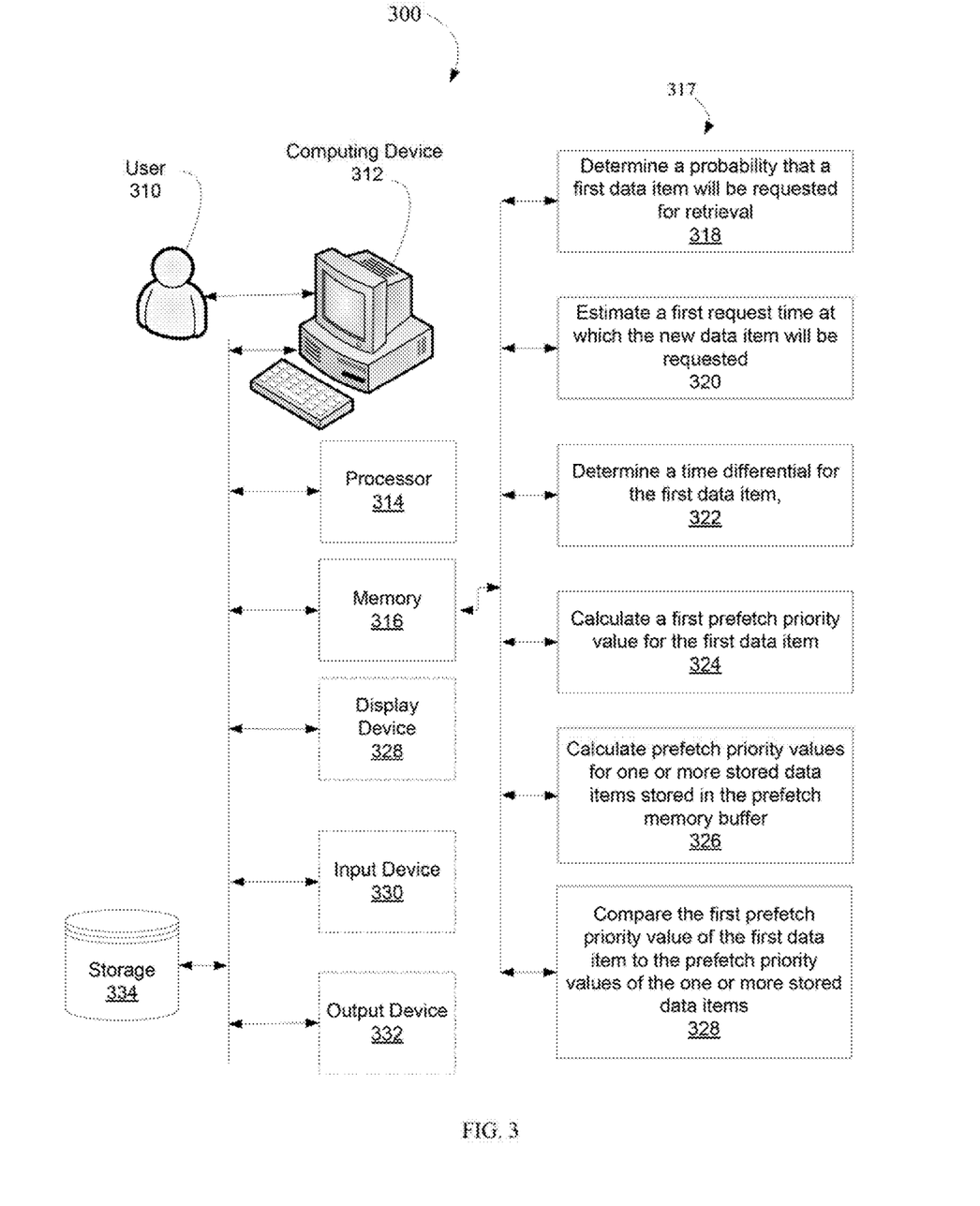
FIG. 3 is a schematic illustration of a system for managing data items retrieved for storage in a prefetch memory buffer, according to an illustrative implementation.

FIG. 3 is a schematic illustration of a system for managing data items retrieved for storage in a prefetch buffer system 300 (hereinafter "system") according to an illustrative implementation. The system 300 includes a computing device 312 that includes a processor 314 and memory 316. The memory 316 includes code representing instructions 317 that when executed cause the processor to determine a probability that a first data item, i.e. block of data, will be requested for retrieval 318. The memory 316 includes code representing instructions 317 that when executed estimate 320 a first request time at which the new data item will be requested, and determine 322 a time differential for the first data item, wherein the time differential is determined based on current time and the first request time. Additionally, the memory 316 includes code representing instructions 317 that when executed calculate 324 a first prefetch priority value for the first data item based on the first data item probability and the time differential. The memory 316 includes code representing instructions 317 that when executed calculate 326 prefetch priority values for one or more stored data items stored in the prefetch memory buffer, and compare 328 the first prefetch priority value of the first data item to the prefetch priority values of the one or more stored data items to identify at least one stored data item having a prefetch priority value lower than the first prefetch priority value.

In some implementations, the memory 316 includes code representing instructions that when executed cause the processor 314 to group the one or more stored data items into subsets lists of similar probability of request for retrieval. In some implementations, the memory 316 includes code representing instructions that when executed cause the processor 314 to calculate the prefetch priority values for each stored data item identified as having the largest time differential in each subset of similar probability (not shown). In some implementations, the memory 316 includes code representing instructions that when executed cause the processor 314 to replace the at least one stored data item identified as having a prefetch priority value lower than the first prefetch priority value with the first data item in the prefetch memory buffer (not shown). This comparison technique is helpful in increasing computational efficiency because prefetch priority values are calculated only for each stored data item identified as having the largest time differential in each subset of similar probability.

In some implementations, the memory 316 includes code (not shown) representing instructions that when executed cause the processor 314 to analyze one or more properties for requests of one or more subsequent data items to determine a probability that a new data item will be requested. In some implementations, the memory 316 includes code representing instructions that when executed cause the processor 314 to analyze one or more properties for request of one or more subsequent data items to estimate a time at which a new data item will be requested. For example, the code may analyze a pattern of access requests to determine probability of requesting a new data item and to estimate the request time for the new data item in keeping with the pattern of access requests.

In some implementations, the memory 316 includes code (not shown) representing instructions that when executed cause the processor 314 to recalculate prefetch priority values for one or more data items stored in the prefetch memory buffer until a new request is received for a data item or until it is determined a new data item will probably be requested. This is necessary because the prefetch priority value is time dependent and as an estimated time approaches, the prefetch priority value increases. Likewise, if the probability of request changes, the prefetch priority value changes accordingly. In some implementations, the memory 316 includes code (not shown) representing instructions that when executed cause the processor 314 to assign a highest prefetch priority value to a new data item actually requested by a user. Actual requests by a user may be accompanied by a designation or marker that the system recognizes as corresponding to an actual request being made for a new data item, rather than, for example, a request scheduled to be made in the future. In this implementation, assigning a highest prefetch priority value to a new data item that is actually requested, i.e. fetching a data item that is actually requested, will always trump prefetching a data item that is predicted to be requested. In some implementations, a designation or marker is applied to the hints, rather than the actual request. This enables the system to distinguish between an actual request and hints that suggest a request may be coming.

In this implementation, a user 310 interacts with computing device 312, and the user 310 is requesting or about to request information. To enable interaction with the user 310, the system 300 further includes a display device 328, an input device 330, an output device 332, and a storage device 334. The input device 330, the output device 332, and the display device 328 are optional components of the system 300. The modules and devices described herein can, for example, utilize the processor 314 to execute computer executable instructions and/or the modules and devices described herein can, for example, include their own processor to execute computer executable instructions, e.g., an encryption processing unit, a field programmable gate array processing unit, etc. It should be understood that the system 300 can include, for example, other modules, devices, and/or processors known in the art and/or varieties of the illustrated modules, devices, and/or processors.

The input device 330 receives information associated with the system 300 from a user 310 and/or another computing system (not shown). The input device 330 can include, for example, a keyboard, a scanner, etc. The output device 432 outputs information associated with the system 300 e.g., information to a printer (not shown), information to a speaker, etc.

The display device 328 displays information associated with the system 300, e.g., status information, configuration information, graphical objects, etc. The processor 314 executes the operating system and/or any other computer executable instructions for the system 300, e.g., executes applications, etc.

The storage device 334 can include a plurality of storage devices and/or the system 300 can include a plurality of storage devices. The storage device 334 can include, for example, long-term storage, e.g., a hard drive, a tape storage device, flash memory, etc., short-term storage, e.g., a random access memory, a graphics memory, etc., and/or any other type of computer readable storage.

The disclosure, in another aspect, features a computer program product, tangibly embodied on computer-readable media. As depicted in the illustrative implementation of FIG. 4, the computer program product includes a set of instructions 400 that is operable to cause a data processing apparatus, e.g. the computer system 212 of FIG. 3, to determine 405 a probability that a first data item, i.e., block of data, will be requested for retrieval and estimate 410 a first request time at which the new data item will be requested. The computer program product includes a set of instructions 400 that is operable to cause a data processing apparatus to determine 415 a time differential for the first data item, wherein the time differential is determined based on current time and the first request time, and calculate 420 a first prefetch priority value for the first data item based on the first data item probability and the time differential. The computer program product includes a set of instructions 400 that is operable to cause a data processing apparatus to calculate 425 prefetch priority values for one or more stored data items stored in the prefetch memory buffer, and compare 430 the first prefetch priority value of the first data item to the prefetch priority values of the one or more stored data items to identify at least one stored data item having a prefetch priority value lower than the first prefetch priority value.

Figure 4:
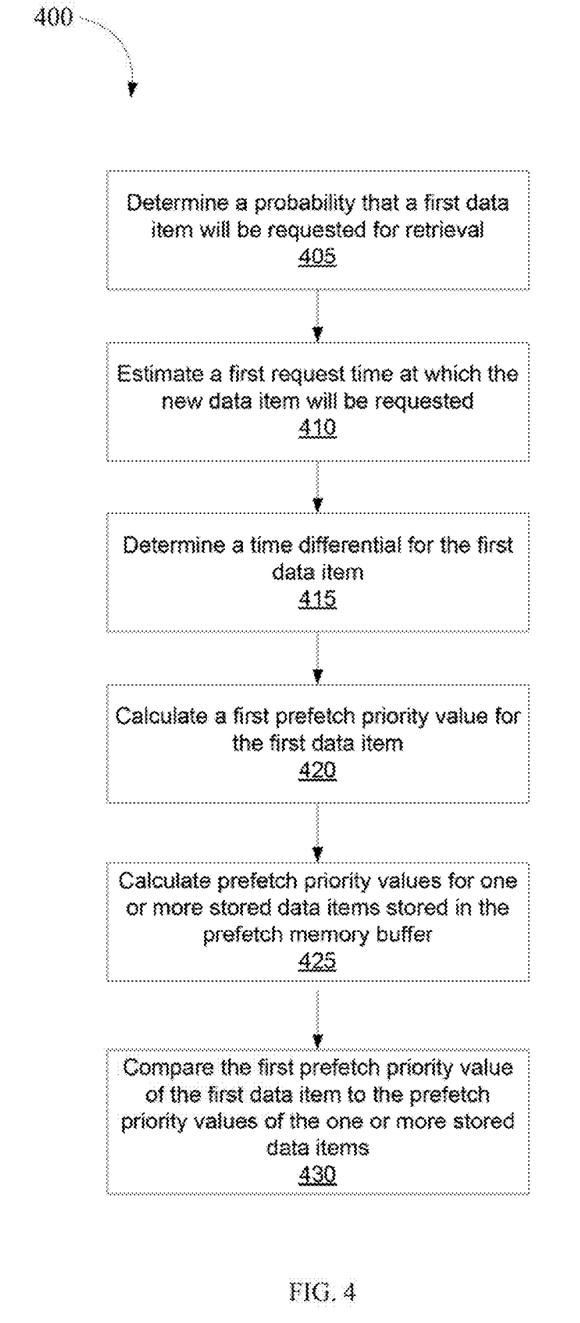
FIG. 4 is a flowchart of a method for managing data items retrieved for storage in a prefetch memory buffer, according to an illustrative implementation.

In some implementations, the computer program product includes instructions (not shown) that are operable to cause a data processing apparatus to group the one or more stored data items into subsets of similar probability. In some implementations, the computer program product includes instructions (not shown) that are operable to cause a data processing apparatus to calculate the prefetch priority values for each stored data item identified as having the largest time differential in each subset of similar probability. In some implementations, the computer program product includes instructions (not shown) that are operable to cause a data processing apparatus to replace the at least one stored data item identified as having a prefetch priority value lower than the first prefetch priority value with the first data item in the prefetch memory buffer. This comparison technique is helpful in increasing computational efficiency because prefetch priority values are calculated only for each stored data item identified as having the largest time differential in each subset of similar probability.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data, e.g., magnetic, magneto-optical disks, or optical disks.

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device, e.g., a mouse or a trackball by which the user can provide input to the computer, e.g., interact with a user interface element. Other kinds of devices can be used to provide for interaction with a user. Other devices can, for example, be feedback provided to the user in any sensory form, e.g., visual feedback, auditory feedback, or tactile feedback. Input from the user can, for example, be received in any form, including acoustic, speech, eye-gaze, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication, e.g., a communication network. Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network, e.g., local area network (LAN), wide area network (WAN), campus area network (CAN), metropolitan area network (MAN), home area network (HAN)), a private IP network, an IP private branch exchange (IPBX), a wireless network, e.g., radio access network (RAN), 802.11 network, 802.16 network, general packet radio service (GPRS) network, HiperLAN, and/or other packet-based networks. Circuit-based networks can include, for example, the public switched telephone network (PSTN), a private branch exchange (PBX), a wireless network, e.g., RAN, bluetooth, code-division multiple access (CDMA) network, time division multiple access (TDMA) network, global system for mobile communications (GSM) network, and/or other circuit-based networks.

The computing device can include, for example, a computer, a computer with a browser device, a telephone, an IP phone, a mobile device, e.g., cellular phone, personal digital assistant (PDA) device, laptop computer, electronic mail device, and/or other communication devices. The browser device includes, for example, a computer, e.g., desktop computer, laptop computer, with a world wide web browser, e.g., Chrome browser available from Google Inc., Mozilla® Firefox available from Mozilla Corporation. The mobile computing device includes, for example, an Android®-based smart phone.

Comprise, include, and/or plural forms of each are open ended and include the listed parts and can include additional parts that are not listed. And/or is open ended and includes one or more of the listed parts and combinations of the listed parts.

One skilled in the art will realize the disclosure may be embodied in other specific forms without departing from the spirit or essential characteristics thereof. The foregoing implementations are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein.

The invention claimed is:

1. A method for managing data items retrieved for storage in a prefetch memory buffer, the method comprising:
   a) determining a probability that a first data item will be requested for retrieval;
   b) estimating a first request time at which the new data item will be requested;
   c) determining a time differential for the first data item, wherein the time differential is determined based on current time and the first request time;
   d) calculating a first prefetch priority value for the first data item based on the first data item probability and the time differential;
   e) calculating prefetch priority values for one or more stored data items stored in the prefetch memory buffer; and
   f) comparing the first prefetch priority value of the first data item to the prefetch priority values of the one or more stored data items to identify at least one stored data item having a prefetch priority value lower than the first prefetch priority value.

2. The method of claim 1, further comprising grouping the one or more stored data items stored in the prefetch memory buffer into subsets of based on probability.

3. The method of claim 2, wherein calculating the prefetch priority values for one or more stored data items includes calculating the prefetch priority values for each stored data item identified as having the largest time differential in each subset.

4. The method of claim 1, further comprising replacing the at least one stored data item identified as having a prefetch priority value lower than the first prefetch priority value with the first data item in the prefetch memory buffer.

5. The method of claim 1, further comprising analyzing one or more properties for requests of one or more subsequent data items to determine a probability that a new data item will be requested.

6. The method of claim 1, further comprising analyzing one or more properties for request of one or more subsequent data items to estimate a time at which a new data item will be requested.

7. The method of claim 1, comprising recalculating prefetch priority values for one or more data items stored in the prefetch memory buffer until a new request is received for a data item or until it is determined a new data item will probably be requested.

8. The method of claim 1, comprising assigning a highest prefetch priority value to a new data item actually requested by a user.

9. A system for managing data items retrieved for storage in a prefetch buffer, the system comprising:
   a processor, and;
   a memory, the memory including code representing instructions that when executed cause the processor to:
   determine a probability that a first data item will be requested for retrieval;
   estimate a first request time at which the new data item will be requested;
   determine a time differential for the first data item, wherein the time differential is determined based on current time and the first request time;
   calculate a first prefetch priority value for the first data item based on the first data item probability and the time differential;
   calculate prefetch priority values for one or more stored data items stored in the prefetch memory buffer; and
   compare the first prefetch priority value of the first data item to the prefetch priority values of the one or more stored data items to identify at least one stored data item having a prefetch priority value lower than the first prefetch priority value.

10. The system of claim 9, wherein the memory includes code representing instructions that when executed cause the processor to group the one or more stored data items into subsets based on probability.

11. The system of claim 10, wherein the memory includes code representing instructions that when executed cause the processor to calculate the prefetch priority values for each stored data item identified as having the largest time differential in each subset.

12. The method of claim 9, wherein the memory includes code representing instructions that when executed cause the processor to replace the at least one stored data item identified as having a prefetch priority value lower than the first prefetch priority value with the first data item in the prefetch memory buffer.

13. The system of claim 9, wherein the memory includes code representing instructions that when executed cause the processor to analyze one or more properties for requests of one or more subsequent data items to determine a probability that a new data item will be requested.

14. The system of claim 9, wherein the memory includes code representing instructions that when executed cause the processor to analyze one or more properties for request of one or more subsequent data items to estimate a time at which a new data item will be requested.

15. The system of claim 9, wherein the memory includes code representing instructions that when executed cause the processor to recalculate prefetch priority values for one or more data items stored in the prefetch memory buffer until a new request is received for a data item or until it is determined a new data item will probably be requested.

16. The system of claim 9, wherein the memory includes code representing instructions that when executed cause the processor to assign a highest prefetch priority value to a new data item actually requested by a user.

17. A computer program product, tangibly embodied on non-transitory computer-readable media, the computer program product being configured to cause a data processing apparatus to:
   determine a probability that a first data item will be requested for retrieval;
   estimate a first request time at which the new data item will be requested;

determine a time differential for the first data item, wherein the time differential is determined based on current time and the first request time;

calculate a first prefetch priority value for the first data item based on the first data item probability and the time differential;

calculate prefetch priority values for one or more stored data items stored in the prefetch memory buffer; and compare the first prefetch priority value of the first data item to the prefetch priority values of the one or more stored data items to identify at least one stored data item having a prefetch priority value lower than the first prefetch priority value.

18. The computer program product of claim 17, further comprising being configured to cause a data processing apparatus to group the one or more stored data items into subsets based on probability.

19. The computer program product of claim 18, further comprising being configured to cause a data processing apparatus to calculate the prefetch priority values for each stored data item identified as having the largest time differential in each subset.

20. The computer program product of claim 17, further comprising being configured to cause a data processing apparatus to replace the at least one stored data item identified as having a prefetch priority value lower than the first prefetch priority value with the first data item in the prefetch memory buffer.

* * * * *